United States Patent Office 3,754,056
Patented Aug. 21, 1973

3,754,056
ANTIOXIDANT COMPOSITIONS AND POLYMERS STABILIZED THEREBY
Gary A. Harpell, Brecksville, Ohio, assignor to Goodrich-Gulf Chemicals, Inc., Cleveland, Ohio
Original application Apr. 10, 1969, Ser. No. 815,147. Divided and this application Feb. 17, 1971, Ser. No. 116,266
Int. Cl. C08d 9/16
U.S. Cl. 260—892
8 Claims

ABSTRACT OF THE DISCLOSURE

The reaction product of an organometallic compound and an organic nitro compound provides a stabilizing composition for elastomers. The stabilizing composition can be of low molecular weight, or can be polymeric in nature.

---

This is a division of application Ser. No. 815,147, filed Apr. 10, 1969, now U.S. Pat. 3,629,345.

BACKGROUND OF THE INVENTION

Field of the invention

This invention relates to antioxidant compositions and to polymers stabilized thereby. More particularly, this invention relates to a new class of relatively non-fugitive antioxidants especially effective in the stabilization of polymers against oxidation.

Description of the prior art

Antioxidants have long been employed to minimize the deteriorating effects of oxidation on polymers. Because of the volatility and relative insolubility of many antioxidants in polymer cements and/or latices, only a small portion of the antioxidant added to the polymeric system actually finds its way into the final polymer. Accordingly, it is desirable to provide highly efficient, relatively non-fugitive antioxidant compositions which impart a high degree of stability to the polymer even when present in small amounts.

SUMMARY OF THE INVENTION

It is, therefore, an object of this invention to provide a new class of antioxidants which impart greatly enhanced stability to polymers and copolymers, even when present in relatively small amounts.

It is another object of this invention to provide a new class of relativley non-fugitive antioxidants.

It is still another object of this invention to provide polymers exhibiting enhanced stability toward oxidation.

These and other objects are accomplished in accordance with the present invention which provides an antioxidant composition comprising the reaction product of (1) a composition having the empirical formula:

$$A-M$$

wherein A is an organic carbanion which can be polymeric in nature, or an alkyl, aryl, aralkyl or cycloalkyl radical containing from 1 to about 20 carbon atoms, and M is an alkali metal, and (2) a composition having the empirical formula:

$$(Q)_m-R-(NO_2)_n$$

wherein Q is a substituent such as halogen, hydroxy, alkoxy, aryloxy and the like, R can be an alkyl, aryl, aralkyl, or cycloalkyl radical, containing from 1 to about 20 carbon atoms, such as i-propyl, n-butyl, tert.-butyl, phenyl, xylyl, cyclohexyl and the like, and can be polymeric or polynuclear; wherein $m$ is an integer from zreo to about 10; and wherein $n$ is an integer from 1 to about 4.

DESCRIPTION OF THE DRAWINGS

The effectiveness of the antioxidant compositions of the present invention can be readily ascertained by reference to the accompanying drawing wherein

FIG. 1 shows the results of tensile testing of certain of the antioxidants of the present invention, when the polymer is subjected to 70° C. aging for periods of time ranging up to 50 days. FIG. 1 also shows the effect of a conventional antioxidant, and no antioxidant, when the same polymer is so treated and tested with the stabilized polymer.

FIG. 2 shows the effect of one of the antioxidants of the present invention on a stereoregular polymer. The unstabilized polymer is shown for comparison.

FIG. 3 presents elongation testing of certain of the antioxidants of the present invention in a block copolymer, along with unstabilized-control testing.

DESCRIPTION OF THE INVENTION

Figure 1:
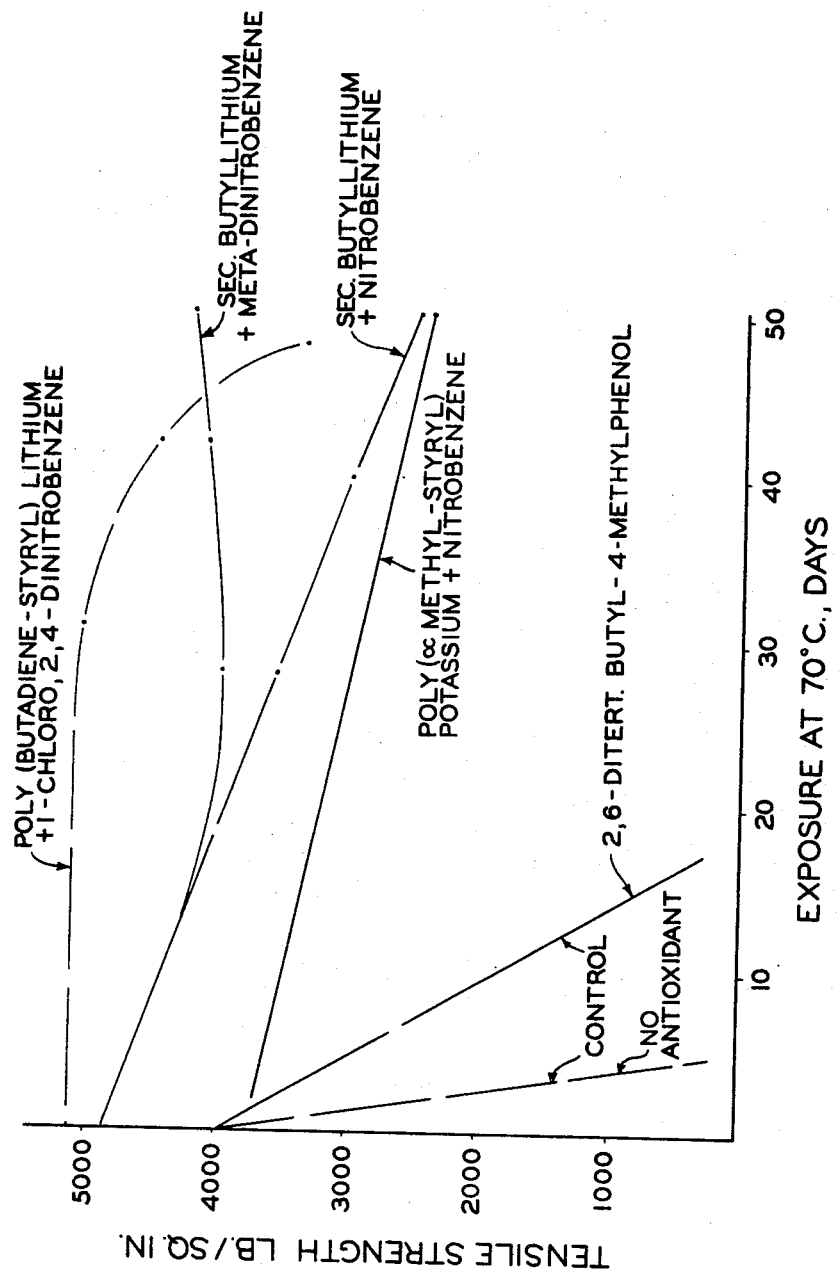
FIGS. 1, 2 and 3 represent graphic comparisons of the effect of air-oven aging on the properties of polymers stabilized with antioxidants of the present invention, polymers stabilized with a conventional antioxidant, and polymers containing no antioxidant.

In one embodiment, the present invention provides a new class of antioxidants for the stabilization of polymeric materials.

In another embodiment, the present invention provides polymers exhibiting enhanced stability toward oxidation by incorporating in said polymer an effective stabilizing amount of the above-defined antioxidant composition; generally, from about 0.01 to about 10 weight percent of said antioxidant has been found sufficient for such purposes.

The term "polymer" as employed herein is intended to define homopolymers, copolymers and terpolymers whether random, block, graft and the like, which are normally susceptible to oxidation and are generally prepared from conjugated dienes and other monomers copolymerizable therewith, such as vinyl-substituted organic compounds. Illustrative of the conjugated dienes whose polymeric forms are effectively protected by the present invention are those containing from about 4 to about 12 carbon atoms, such as butadiene-1,3, 2-methyl butadiene-1,3, (isoprene), 2,3-dimethyl butadiene-1,3, hexadiene-1,3, pentadiene-1,3 (pi-perylene), 2-methyl hexadiene-1,3, 2-phenyl butadiene-1,3, 3-methyl butadiene-1,3, 2-phenyl-3-ethyl butadiene-1,3, octadiene-1,3; and the like. The vinyl-substituted organic comonomers are preferably aromatic compounds containing from about 8 to about 20 carbon atoms per molecule such as styrene, divinyl benzene, α-methyl styrene, tertiary butyl styrene, vinyl toluene, vinyl naphthalene; and the like. In addition, said vinyl-substituted compounds can be acrylic acid esters, alkacrylic acid esters, nitriles; and the like, such as methyl acrylate, ethyl acrylate, methyl methacrylate, ethyl methacrylate, propyl methacrylate, ethyl ethacrylate, acrylonitrile; and the like.

The antioxidant compositions of the present invention can be prepared by reacting: (1) an organo-metal composition having the formula:

$$A-M$$

wherein A is a polymeric organic carbanion such as poly-(butadienyl), poly(styryl), poly(isoprenyl), poly(butadiene-styryl), and the like, having a molecular weight in the range of about 1000 to about 500,000; or an alkyl, aryl, aralkyl or cycloalkyl radical containing from 1 to about 20 carbon atoms; such as i-propyl, n-butyl, tert.-butyl, cyclohexyl, phenyl, xylyl, and the like; and M is an alkali metal, such as lithium, sodium, potassium, rubidium or cesium, and (2) an organo-nitro composition having the formula:

$$(Q)_m\text{---}R\text{---}(NO_2)_n$$

wherein Q is a substituent such as halogen, hydroxy, alkoxy, aryloxy and the like, R can be an alkyl, aryl, aralkyl, or cycloalkyl radical, containing from 1 to about 20 carbon atoms, such as i-propyl, n-butyl, tert-butyl, phenyl, xylyl, cyclohexyl, and the like, and can be polymeric or polynuclear; wherein $m$ is an integer from zero to about 10; and wherein $n$ is an integer from 1 to about 4.

Illustrative of the organo-metal compositions are such compounds as polystyryl lithium, polybutadienyl lithium, alphamethyl styryl sodium, stilbenyl lithium, sec.-butyl lithium, n-butyl lithium, phenyl lithium, styryl potassium, polybutadienestyryl lithium, tert.-butyl lithium; and the like.

Illustrative of the organo-nitro compositions are such compounds as nitrobenzene, nitromethane, 1,3-dinitrohexane, 1-chloro-2,4 - dinitrobenzene, 1 - cyclohexyl - 3- nitrobenzene, 1,3,5-trinitrobenzene, meta-dinitrobenzene, ortho-nitrobenzene, para-nitrotoluene, 2,4-dinitrotoluene, 6,8,12 - trinitrododecane, 2 - nitropropane, ortho - nitrophenyl ether, meta-nitrobenzyl alcohol, 1-chloro-2,6-dinitrocyclohexane, poly(2 - nitro - 1,3 - butadiene), poly-(meta-nitrostyrene), α-nitronaphthalene, 1,3,8 - trinitroanthracene, and the like.

The antioxidants of the present invention are prepared in the following manner:

The organo-metal composition represented by the formula A---M and the organo-nitro composition represented by the formula $(Q)_m\text{---}R\text{---}(NO_2)_n$, where the compositions are as hereinbefore described, can be admixed at temperatures from about 0° to about 100° C., preferably from about 10 to 50° C. for about one hour, although longer or shorter periods can be employed. While the reaction can be run without solvent where the reactants are themselves liquid, an inert organic solvent, such as, for instance, benzene, hexane, petroleum ether or the like, is preferably employed for thorough mixing and ease of handling. Following the reaction period, the antioxidant composition can be added to the polymer to be protected by admixture of the polymer and the reaction solution containing the reaction product, and co-coagulation of the resulting mixture. Alternatively, the solvent can be removed from the reaction product, and the antioxidant thus obtained admixed with the polymer to be protected.

Polymeric antioxidants of the present invention are prepared in the following manner:

A reaction vessel of appropriate size for the reaction is cleaned and purged of gaseous contaminants with dry nitrogen. Thereafter, an inert organic solvent, such as, for instance, benzene, hexane, petroleum ether or the like, is added in an amount sufficient to give about a 10 percent solution by weight of the finished polymer. A monomer, such as, for instance, styrene, butadiene, isoprene, or the like, is added, and a catalytic amount of initiator, such as, for instance, secondary butyllithium, potassium metal, or the like, is introduced. Polymerization is conducted at 25 to 40° C. for a period ranging from about ½ to 4 hours. Thereafter, additional monomer or other monomeric materials can be added successively to prepare homopolymers or block copolymers. The polymeric antioxidant of the present invention is then formed by the addition of an amount of organo-nitro composition such as, for instance, meta-dinitrobenzene, ortho-nitrophenyl phenyl ether, nitropropane, or the like, which amount is sufficient to react completely with the polymerization initiator. The solvent can be removed from the reaction mixture and the polymeric antioxidant used per se, or the solvent can be retained and the solution added to the polymer emulsion or cement, and co-coagulated therewith. Commonly, about 1 percent of the antioxidant composition is found to be effective for protection; however, amounts from about 0.1 to about 10 weight percent can be used.

The antioxidant of the present invention can be readily incorporated into the polymers to be stabilized against oxidation, using techniques well known to those skilled in the art. It has been found that when the antioxidant is incorporated into the polymer, it is effective against oxidation even when present in relatively small amounts. Since the antioxidant of the present invention can be polymeric in nature, it can easily be blended with the polymer to be stabilized, and be relatively non-fugitive due to close approximation with the solubility and volatility characteristics of the polymer. Even in instances where the antioxidant is of relatively low molecular weight, it has been found to be effective when present in small amounts, and to be relatively non-fugitive.

It should be noted that the active moiety of the present invention can be present to a greater or lesser extent, depending on the molecular weight of the antioxidant species; i.e., the low-molecular-weight species of the present invention contains a relatively greater percentage of the active moiety than does the polymeric species. However, even when the active moiety is present in very small amounts, as when the polymeric form is empolyed, the ability of the present invention to protect polymers against oxidation has been found to be surprisingly better than that of conventional antioxidants.

Generally, from about 0.1 to about 10 percent by weight of the antioxidant of the present invention, based on total polymer, has been found to effectively stabilize polymers against oxidative degradation. Preferably, the antioxidant is incorporated in said polymers in amounts of from about 0.1 to about 5 percent by weight.

The following examples are for illustrative purposes only, and are not to be construed as limiting the scope or spirit of the present invention. Unless otherwise stated, all percentages are parts by weight.

EXAMPLE 1

Polymer preparation

A three-block styrene-butadiene-styrene polymer is prepared as follows:

To a dry quart beverage bottle is added 400 milliliters (ml.) of toluene, 0.6 ml. of 1-molar secondary butyllithium in toluene solution, and 18 ml. of styrene. The bottle is purged with nitrogen, capped, and polymerization conducted at 40° C. for 1.5 hours. Thereafter, an aliquot of 30 grams (g.) of butadiene-1,3 is charged to the bottle, and the polymerization continued for 3 additional hours. Finally, a 10-ml. aliquot of styrene is charged to the bottle, and polymerization continued for an additional 1.5 hours. The polymerization is terminated by the addition of 1 ml. of methanol. The resulting polymer is coagulated in methanol, washed and dried.

Antioxidant preparation

To a dry 250-ml. flask is added 4 ml. of 1-molar secondary butyllithium in benzene solution, and 2 ml. of nitrobenzene. The resulting mixture is allowed to react at 25° C. for one hour. Thereafter, a benzene solution containing 100 g. of styrene-butadiene-styrene block copolymer produced as described above is added to the mixture with agitation. The solvent is evaporated, and the resulting polymer, containing less than 1 percent of the reaction product of secondary butyllithium and nitrobenzene, is milled and molded into sheets at 320° F. Test specimens are cut from the resulting sheets.

In a similar manner, the reaction product of secondary butyllithium and meta-dinitrobenzene is prepared and incorporated into the three-block styrene-butadiene-styrene polymer, and test specimens obtained.

For purposes of comparison, test specimens of the three-block polymer containing no antioxidant are prepared. In addition, a known antioxidant, 2,6-di-tertiarybutyl-4- methylphenol is incorporated into the polymer by dissolving 100 g. of the polymer and 1 g. of the antioxidant in benzene. The solvent is evaporated. The resulting stabilized polymer is milled and molded into sheets at 320° F., and test specimens cut therefrom. The stabilized polymer and the control sample are aged in an air oven at 70° C. for up to 50 days, and tensile tests run on the specimens. The results of the tensile testing are shown in FIG. 1.

Figure 2:
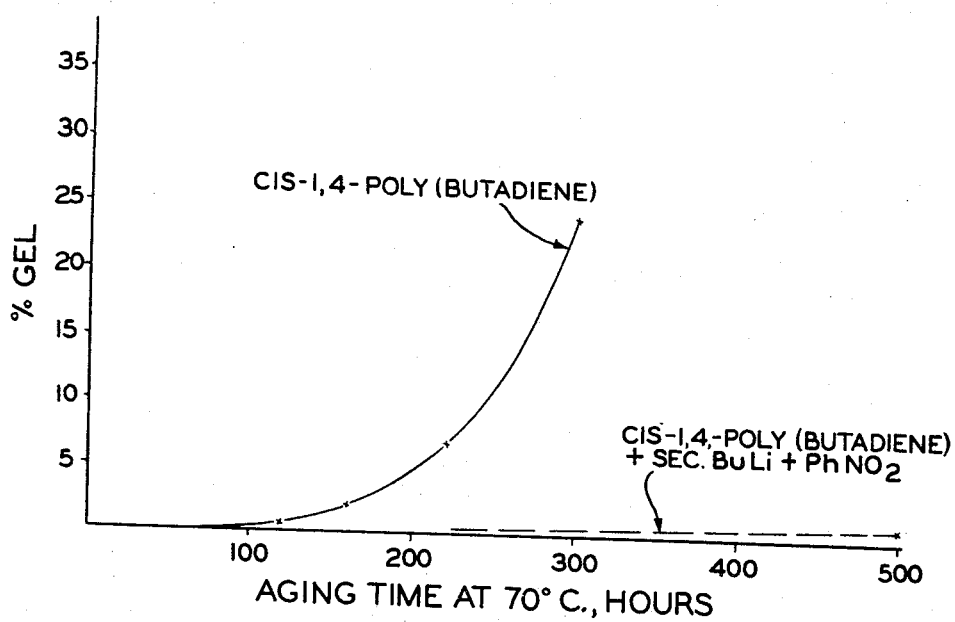

In order to determine the effectivenss of the antioxidants of the present invention on stereoregular (Ziegler-type) polymers, the reaction product of sec.-butyllithium and nitrobenzene is prepared as above, and incorporated into poly(butadiene) having a Mooney viscosity of about 40, and having at least 98% of the molecular structure in the cis-1,4 configuration. The samples are aged at 70° C., and gel determinations run at intervals. The results are shown in FIG. 2.

EXAMPLE 2

To a dry 50-ml. flask are added 200 ml. of tetrahydrofuran, 20 ml. of α-methyl styrene, and 0.6 g. of clean potassium metal. Polymerization is conducted at 25° C. for 1.5 hours, forming a poly(α-methyl styryl) carbanion with a potassium counter-ion. 5 ml. of nitrobenzene are added and allowed to react at 25° C. for one hour. An aliquot containing 1 g. of reaction product is added to a benzene solution containing 100 g. of the three-block polymer prepared as in Example 1. The solutions are thoroughly mixed, and the stabilized polymer recovered and tested as in Example 1. The test results are shown in FIG. 1.

EXAMPLE 3

A polymeric antioxidant of the present invention is prepared as in Example 2, using poly(butadiene-styryl) lithium and 1-chloro-2,4-dinitrobenzene. The polymeric antioxidant is incorporated into the three-bolck copolymer prepared as in Example 1, and the stabilized polymer recovered and tested as in Example 1. The test results are shown in FIG. 1.

EXAMPLE 4

Figure 3:
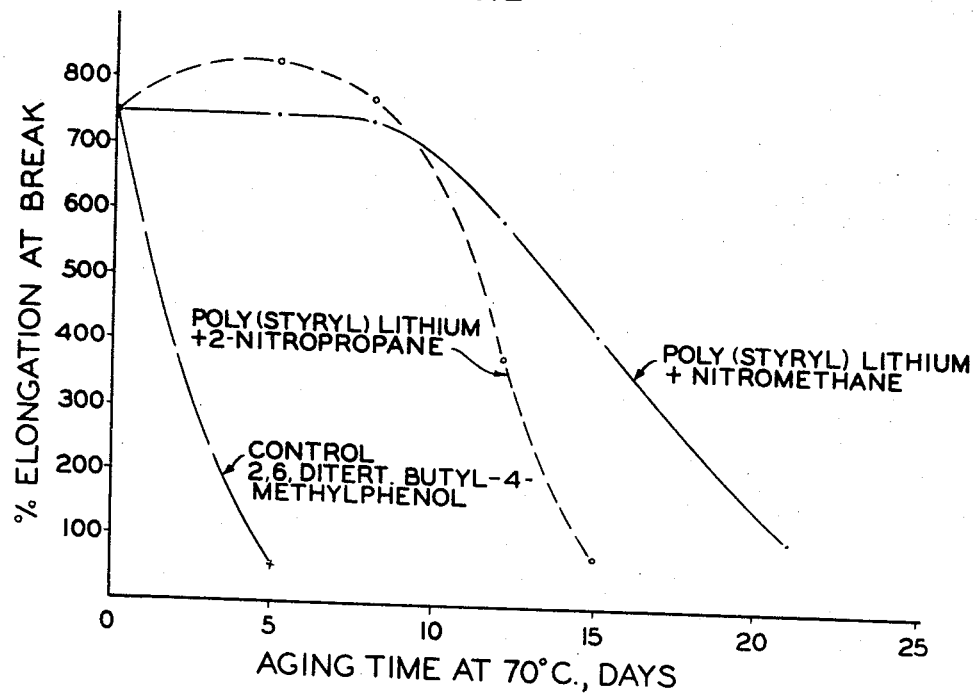

The antioxidant of the present invention is prepared as in Example 3, using poly(styryl) lithium and 2-nitropropane. Ten percent by weight of the antioxidant so produced is incorporated into the three-block copolymer prepared as in Example 1, and the stabilized polymer recovered and tested for retention of elongation properties. The test results are shown in FIG. 3.

EXAMPLE 5

The antioxidant of the present invention is prepared as in Example 3, using poly(styryl) lithium and nitromethane. Ten percent by weight of the antioxidant so produced is incorporated into the three-block copolymer prepared as in Example 1, and the stabilized polymer recovered and tested as in Example 4. The test results are shown in FIG. 3.

What is claimed is:

1. Polymers of conjugated diolefins stabilized against oxidative degradation by the incorporation therein of from about 0.1 to about 10 weight percent of an antioxidant composition compirsing the reaction product of
   (1) A—M, wherein A is a polymeric organic carbanion with molecular weight in the range of about 1,000 to about 500,000; M is an alkali metal, and
   (2) $(Q)_m$—R—$(NO_2)_n$, wherein Q is halogen, hydroxy, alkoxy, or aryloxy; R is alkyl, aryl, aralkyl or cycloalkyl, containing from 1 to about 20 carbon atoms; $m$ is an integer from 0 to about 10; and $n$ is an integer from 1 to about 4.

2. Conjugated diolefins copolymerized with vinyl-substituted organic compounds, wherein said copolymers are protected against oxidative degradation by the incorporation of from about 0.1 to about 10 weight percent of the composition in claim 1.

3. Stabilized polymers of conjugated diolefins of claim 1 wherein A is selected from the group consisting of poly(polybutadienyl), poly(styryl), poly(isopropenyl), poly(butadiene-styryl).

4. Poly(isoprene) when stabilized against oxidative degradation by the incorporation therein of from about 0.1 to about 10 weight percent of the composition in claim 1.

5. Poly(butadiene) when stabilized against oxidative degradation by the incorporation therein of from about 0.1 to about 10 weight percent of the composition in claim 1.

6. Styrene-butadiene polymers when stabilized against oxidative degradation by the incorporation therein of from about 0.1 to about 10 weight percent of the composition in claim 1.

7. Stabilized polymers of conjugated diolefins of claim 1 wherein (2) is selected from the group consisting of nitrobenzene, nitromethane, 1,3-dinitrohexane, 1-chloro-2,4-dinitrobenzene, 1-cyclohexyl-3-nitrobenzene, 1,3,5-trinitrobenzene, meta-dinitrobenzene, ortho-nitrotoluene, para-nitrotoluene, 2,4-dinitrotoluene, 6,8,12-trinitrododecane, 2-nitropropane, ortho-nitrophenyl phenyl ether, meta-nitrobenzyl alcohol, 1-chloro-2,6-dinitrocyclohexane, poly(2-nitro-1,3-butadiene), poly(meta-nitrostyrene), α-nitronaphthalene and 1,3,8-trinitroanthracene.

8. Stabilized polymerized polymers of conjugated diolefins of claim 7 wherein (1) is selected from the group consisting of poly(α-methyl styryl)potassium, poly(butadienestyryl)lithium, poly(styryl)lithium, and (2) is selected from the group consisting of meta-dinitrobenzene, nitrobenzene, 1-chloro-2,4-nitrobenzene, 2-nitropropane and nitromethane.

References Cited

UNITED STATES PATENTS

| 3,322,738 | 5/1967 | Uraneck et al. | 260—84.7 |
| 3,166,529 | 1/1965 | Newland et al. | 260—45.8 |
| 3,177,165 | 4/1965 | Morris et al. | 260—5 |
| 3,150,209 | 9/1964 | Short et al. | 260—894 |

JOHN C. BLEUTGE, Primary Examiner

J. SEIBERT, Assistant Examiner

U.S. Cl. X.R.

260—45.9 R, 85.1, 93.5 A, 94.7 N, 874, 876 R, 876 B, 879, 880 R, 880 B, 887, 893, 894